Figure 1:
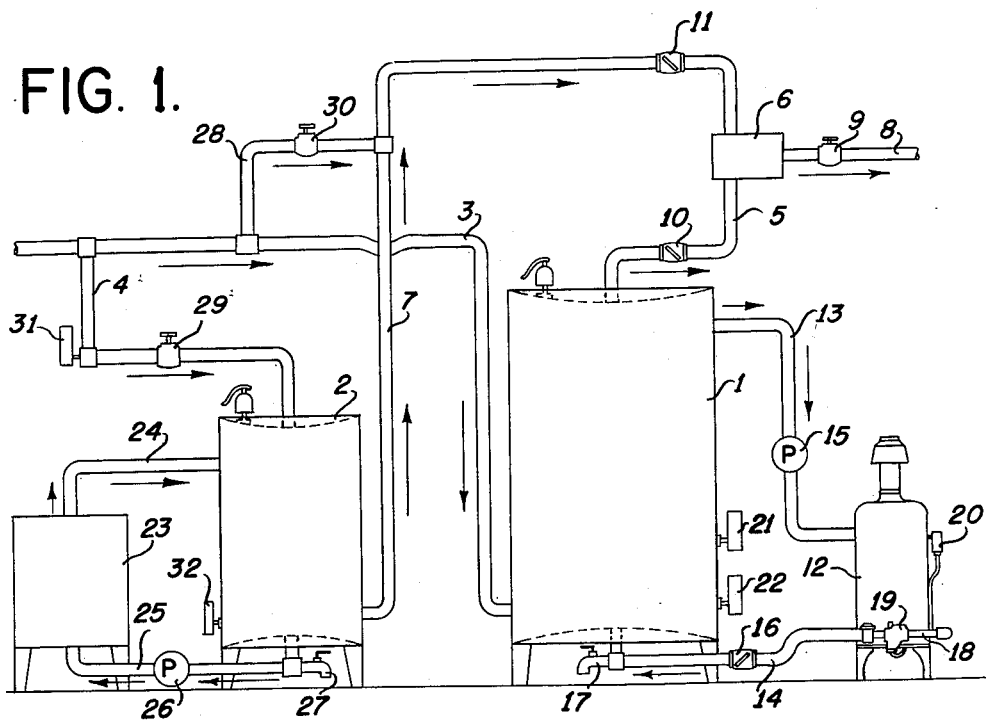

May 9, 1961  M. B. MacKAY  2,983,487

LIQUID SUPPLY SYSTEM

Filed Dec. 20, 1957

INVENTOR.
MALCOLM B. MACKAY

BY Andrus, Sceales & Starke

ATTORNEYS

United States Patent Office 2,983,487
Patented May 9, 1961

2,983,487
LIQUID SUPPLY SYSTEM
Malcolm B. MacKay, Toledo, Ohio, assignor to A. O. Smith Corporation, Milwaukee, Wis., a corporation of New York
Filed Dec. 20, 1957, Ser. No. 704,081
11 Claims. (Cl. 257—275)

This invention relates to a water heating system and more particularly to a water heating system for supplying water at a predetermined temperature for processing operations.

In photofinishing processes, it is necessary to maintain a supply of heated water at a uniform temperature. While maintaining the uniform temperature of the heated water supplied for black and white photographic processes is important, it is absolutely essential that the heated water required for processing color film and prints be supplied at temperatures within plus or minus 2° F. of the desired processing temperature.

If the water temperature is too high in the processing of color film and prints, incomplete reaction may result and the film will have poor color balance, staining or contamination. An excessively high processing temperature can also result in a reduction of the solution activity, and cause expansion or contraction of the sensitized material being processed to produce surface crazing or other visible imperfections.

If the processing water is at too low a temperature, a greater time is required for the processing cycle which reduces the rate of production. Furthermore, a temperature which is too low can also result in retarding the developing activity and adversely affect the density of the finished work.

In order to obtain a temperature which falls within the plus or minus 2° F. tolerance for the processing of color film, both hot and cold water are supplied to a mixing valve which is set at the desired processing temperature. The mixing valve will mix the proper proportions of the hot and cold water and deliver water at the processing temperature to the processing equipment. The ability of the mixing valve to maintain the temperature within the above temperature range depends, to a very great extent, upon maintaining a differential of at least 20° F. between the temperatures of the hot and cold water supplied to the mixing valve. The mixing valve is able to maintain greater uniformity of discharge water temperature when operating on approximately equal volumes on rates of flow of both hot and cold water. When the differential between the temperatures of the hot and cold water supplied to the valve is such that the valve must use more than 80% of either hot or cold water for developing the required discharge temperature, the valve will be less sensitive and will react more slowly. As a result, it would be difficult for the valve to maintain a discharge water temperature which will be in the required limits of plus or minus 2° F.

The present invention is directed to a system for supplying heated water to processing equipment at the precise temperature required for the processing operation. The system automatically compensates for changes in the temperature of the incoming cold water supply by changing the temperature to which the hot water is heated to thereby maintain the proper temperature differential between the hot and cold water supplied to the mixing valve at all times. If the temperature of the incoming cold water supply is above the given processing temperature, for example, 68° F., a portion of the incoming water is chilled beneath 68° F. and stored. A second portion of the cold water supply is heated and stored to maintain a supply of hot water at an elevated temperature which provides the proper temperature differential with respect to the stored, chilled water.

If the incoming cold water supply is below the processing temperature of 68° F., the chilling or refrigerating unit does not operate, but a portion of the water is heated and stored at a second elevated temperature, considerably higher than the hot water temperature employed when the cold water supply is above 68° F. Thus, when the incoming cold water supply is below the processing temperature, the temperature of the heated, stored water is automatically changed to a higher value to provide the proper temperature differential between the hot and cold water in order to supply approximately equal volumes of hot and cold water to the mixing valve to provide the properly tempered water for the processing operation.

More specifically, the apparatus includes a hot water storage tank and a chilled water storage tank. Incoming cold water is conducted to both the chilled water storage tank and the hot water storage tank, and outlet conduits provide communication from both the chilled water tank and the hot water tank to the mixing valve where the hot and chilled water are mixed and discharged through a discharge line to the processing equipment. To chill a portion of the cold water if the temperature of the incoming water supply is above the processing temperature, a water chilling unit is connected to the chilled water storage tank. Similarly, a water heater is connected to the hot water storage tank to heat water to the desired elevated temperature.

A thermostatic device is located in the incoming cold water supply line and is set at the processing temperature, for example, 68° F., while a second thermostatic device is employed in the chilled water storage tank and is set at a temperature a few degrees below the processing temperature, for example, 65° F. In addition, two thermostatic devices are employed in the hot water storage tank, one of the devices being set at a temperature of say 90° F. and the second thermostatic device being set at a considerably higher temperature, as for example 120° F.

If the temperature of the incoming cold water rises above the temperature setting of both the thermostatic devices in the incoming water line and in the chilled water storage tank, the thermostats operate to actuate the water chilling unit and also to set the lower temperature, 90° F., hot water tank thermostat, into the operating circuit. With this circuitry, when the temperature in the hot water tank falls below the setting of the lower limit thermostat, or 90° F., the heater is actuated to heat water and maintain the temperature of the water in the tank at 90° F. Thus, when the incoming water supply is above the processing temperature, a portion of the incoming water is chilled by the water chilling unit and maintained at a temperature of 65° F. slightly below the processing temperature, and secondly, a portion of the water is heated and stored at the lower heated water temperature, 90° F. With the chilled water at 65° F. and the heated water at 90° F., the proper temperature differential is maintained between the hot and chilled water to permit the mixing valve to operate within the small tolerance limits.

If the temperature of the incoming water is below the temperature setting of the thermostat in the incoming water line or if the water in the chilled storage tank is below 65° F., the circuit is broken and the water chilling unit is stopped. In this situation, the higher heated water temperature thermostat at 120° will be put into the operating circuit and if the temperature of the stored water in the storage tank falls beneath 120° F., the heater will operate to maintain the water in the storage tank at this temperature. Therefore, if the incoming water is at a temperature below the processing temperature or 68° F., the temperature setting in the hot water tank will automatically be set at 120° F. to maintain the proper differential between the hot and chilled water.

The present invention provides an apparatus for maintaining the proper temperature differential of 20° F. between the hot and chilled water supplied to the mixing valve to provide a discharge water temperature within a plus or minus 2° F. tolerance. This uniform water temperature is achieved by chilling and storing a portion of the water and heating and storing a second portion of the water at a temperature which provides the proper temperature differential between the hot and chilled water. The temperature setting of the hot water storage tank is automatically changed in accordance with the temperature of the incoming water to maintain the proper temperature differential. In addition, the apparatus operates to prevent chilling of the incoming water when the temperature of the incoming water falls below the temperature of the processing operation.

Other objects and advantages will appear in the course of the following description.

The drawings illustrate the best mode presently contemplated of carrying out the invention.

Figure 2:
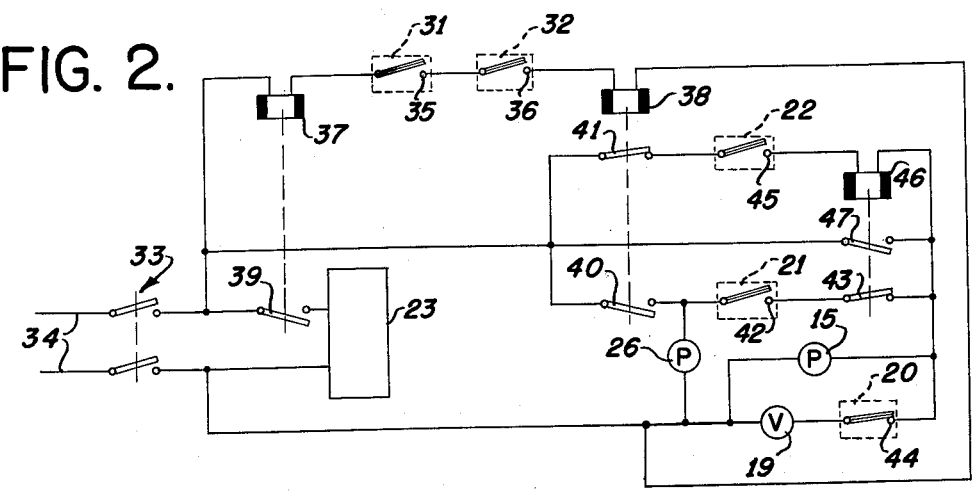

In the drawings:

Figure 1 is a diagrammatic view of the water supply system of the invention; and Fig. 2 is an electrical wiring diagram of the system.

The drawings illustrate an apparatus for supplying a uniform temperature heated water for processing operations, such as color film processing. The apparatus includes a hot water storage tank 1 which is adapted to store heated water at a predetermined elevated temperature and a chilled water storage tank 2 which is adapted to store cold or chilled water at a low temperature.

Water is supplied to the hot water storage tank 1 through an inlet line 3 and a branch line 4 connects the line 3 to the chilled water storage tank to conduct incoming cold water to the chilled water storage tank 2.

Heated water is conducted from the hot water storage tank through outlet line 5 to a mixing valve 6 while chilled water is conducted through outlet line 7 from the chilled water storage tank 2 to the mixing valve. The mixing valve is adapted to mix the proper proportions of the hot and chilled water and discharge water through line 8 to the processing equipment at a given or predetermined processing temperature. The processing temperature may vary depending on the particular type of film or prints to be processed. In the following description, a processing temperature of 68° F. will be used for purposes of illustration.

A suitable valve 9 is employed in discharge line 8 to cut off or control the flow of water to the processing equipment. In addition, check valves 10 and 11 are located in lines 5 and 7, respectively, to prevent the flow of water back to the storage tanks 1 and 2.

To heat the incoming water, a conventional water heater 12 is connected by lines 13 and 14 to the hot water storage tank 1. The water is circulated from the upper portion of the tank 1 through line 13 to heater 12 and is returned through line 14 to the tank by a pump 15 which is located in line 13. A check valve 16 is employed to prevent the reverse flow of liquid through the closed system provided by line 13, heater 12 and line 14. In addition, a suitable drain 17 is employed in the line 14 to permit draining of the water from the heating circuit, if necessary.

The heater 12 is a conventional gas type heater and gas is supplied to the heater through a line 18. A solenoid or diaphragm operated gas valve 19 is located in gas line 18 and supplies gas to the burner in accordance with demand. In addition, a water temperature control thermostat 20 is disposed in contact with the heated water in the tank and is adapted to shut off the gas valve 19 if the temperature within the tank 1 exceeds a predetermined maximum temperature.

To maintain the heated water at the proper temperature, a pair of aquastats 21 and 22 are associated with the storage tank 1. The aquastat 21 is provided with a temperature setting in the neighborhood of 90° F., while the second aquastat 22 is set at a higher temperature of about 120° F. Therefore, if the aquastat 21 is in the operating circuit, the water in the tank 1 will be heated to a temperature of approximately 90° F., while if the second aquastat 22 is in the operating circuit the water will then be heated to a temperature of 120° F.

As the temperature of the cold water entering the system through line 3 is apt to vary widely in temperature throughout the seasons of the year, a means is provided to chill a portion of the water if the incoming water temperature is above the processing temperature or 68° F. To chill the incoming water, a water chilling unit 23 is connected by lines 24 and 25 to the chilled water storage tank 2. A pump 26, disposed in line 25, provides a means for pumping the water from the tank through the water chilling unit 23 and back to the tank. A suitable drain 27 is also employed in the system to drain the chilling unit, if necessary.

In the event that the incoming cold water supply is beneath the processing temperature of 68°, the chilled water tank 2 can be by-passed and the incoming cold water conducted directly to the mixing valve 6. To this end a by-pass line 28 is provided which connects the line 3 directly with line 7. Valves 29 and 30 are located in lines 4 and 28, respectively, to control the flow of the incoming water. For example, if the temperature is below the processing temperature, the valve 29 can be closed and the valve 30 in line 28 opened so that a portion of the incoming water will flow directly from line 3 to line 7. However, if the incoming water temperature is above the processing temperature, it is then necessary to close valve 30 and open valve 29 so that the water may then flow in the chilled water storage tank and be chilled, if necessary.

An aquastat 31 is located in the line 4 and is set at a temperature corresponding to the processing temperature, 68° F. In addition, an aquastat 32 is located in the chilled water storage tank 2. The temperature setting of the aquastat 32 is a few degrees beneath the temperature setting of the aquastat 31 and the processing temperature. For example, if the processing temperature is 68° F., the aquastat 31 is set for 68° F. and the aquastat 32 is set for a temperature of approximately 65° F.

Referring to the electrical diagram shown in Fig. 2, a double-pole main control switch 33 is connected to the power lines 34 and the switch 33 is manually actuated to start or stop the operation of the apparatus. The contacts 35 and 36 of aquastats 31 and 32, respectively, are connected in series with relays 37 and 38 and across the power lines 34.

If the temperature of the incoming cold water in lines 3 and 4 is above the setting of thermostat 31, 68° F., and if the temperature in the chilled water storage tank 2 is above the setting of aquastat 32, 65° F., contacts 35 and 36 will close to energize relays 37 and 38. Energizing relay 37 closes the normally open switch 39 which is connected in the power line 34 leading to the water chilling unit 23. The closing of switch 39 will actuate the chilling unit to chill the water.

The energizing of relay 38 by the closing of contacts 35 and 36 operates to close the normally open switch 40 and open the normally closed switch 41. The switch 40 is connected in series with pump 26 and across the power lines 34. Thus, the closing of switch 40 in energizing relay 38 will start the pump 26 to pump the water from the storage tank 2 to the water chilling unit 23.

Switch 40 is also connected in series with contacts 42 of aquastat 21, with normally closed switch 43 and with pump 15. Gas valve 19 is connected in parallel with pump 15. Therefore, when switch 40 is closed by energizing relay 38 and if the temperature of the water in the tank 1 is below the 90° F. setting of aquastat 21, the pump 15 will start to pump water from the hot water storage tank to the water heater and automatic gas valve 19 will open to admit gas to the water heater 12. The contacts 44 of aquastat 20, which is located in water heater 12, are connected in series with the gas valve 19. The aquastat 20 is provided with a maximum hot water temperature setting so that if the water in the heater 12 exceeds a predetermined maximum temperature, the contacts 44 will open to shut off the gas to the heater.

With the above circuitry, a portion of the incoming cold water will be chilled by the chilling unit 23 and stored at a temperature of approximately 65° F. in the tank 2. In addition, a second portion of the incoming water will be heated and stored at a temperature of 90° F. in the hot water storage tank 1.

If the incoming cold water temperature should fall beneath the temperature setting of thermostat 31, contacts 35 will open, or if the temperature in the chilled water storage tank 2 should fall beneath the temperature setting of 65° F. of thermostat 32, the contacts 36 will open. The opening of either pair of contacts 35 or 36, serves to de-energize relays 37 and 38. De-energizing relay 37 will open switch 39 to stop operation of the water chilling unit 23. In addition, the de-energizing of relay 38 will open switch 40 to stop operation of the pump 26.

The de-energizing of relay 38 by the temperature of the incoming water rising above 68° F., will close normally closed switch 41. The switch 41 is connected in series with the contacts 45 of aquastat 22 and in series with the relay 46. The closing of switch 41 will, if the temperature in the hot water storage tank is below 120° F., energize relay 46 and the energizing of relay 46 will close normally open switch 47 and open the normally closed switch 43. The opening of switches 40 and 43 will take thermostat 21 out of the operating circuit.

The switch 47 is connected across the power lines 34 and in series with pump 15. Thus, the closing of switch 47 will energize the pump 15 and open the gas valve 19 to admit gas to the water heater and to circulate water from the hot water storage tank to the water heater. Thus, when the temperature of the incoming water falls beneath 68° F. or other processing temperature, the water chilling unit 23 is stopped and the temperature setting of the hot water storage tank is automatically raised to 120° F. to provide the proper temperature differential between the cold incoming water and the heated water.

Again, if the incoming water temperature rises above the 68° F. setting of aquastat 31, the circuitry will operate to start the water chilling unit and to put the 90° F. temperature setting of aquastat 21 of the hot water storage tank into the operating circuit.

The present water supply apparatus makes it possible to supply a uniform temperature water to processing equipment. This is achieved by chilling and storing water at a given temperature beneath the processing temperature and heating and storing a second portion of the water at an elevated temperature. The apparatus automatically changes the temperature setting of the hot water storage tank in accordance with the temperature of the incoming water to maintain the proper differential in temperature between the hot and cold water in order to equalize volumes of hot and cold water proportioned by the mixing valve to provide the proper processing temperature.

Various modes of carrying out the invention are contemplated as being within the scope of the following claims particularly pointing out and distinctly claiming the subject matter which is regarded as the invention.

I claim:

1. A water heating system for supplying heated water at a uniform temperature for processing operations, comprising a hot water storage tank, heating means connected to the hot water storage tank for heating the water therein, conduit means for supplying cold water to said hot water storage tank, mixing valve means for mixing quantities of hot and cold water to a given processing temperature, second conduit means for supplying cold water to said mixing valve, third conduit means for supplying hot water to said mixing valve, means responsive to the temperature of the cold water and connected to the heating means for heating the water in said hot water storage tank to a first high temperature when the temperature of the cold water is above a predetermined temperature and for heating the water in said hot water storage tank to a second high temperature substantially higher than first high temperature when the temperature of the cold water is below said predetermined temperature.

2. A water heating system for supplying heated water at a uniform temperature for processing operations, comprising a hot water storage tank, heating means connected to the hot water storage tank for heating the water therein, conduit means for supplying cold water to said hot water storage tank, mixing valve means for mixing quantities of hot and cold water to a given processing temperature, second conduit means for supplying cold water to said mixing valve, third conduit means for supplying hot water from the hot water storage tank to said mixing valve, means responsive to the temperature of the cold water and connected to the heating means for actuating said heating means and heating the water in said hot water storage tank to a first high temperature when the temperature of the cold water is above a predetermined temperature and for heating the water in said hot water storage tank to a second high temperature substantially higher than first high temperature when the temperature of the cold water is below said predetermined temperature, and means responsive to the temperature of the cold water for cooling said cold water when the temperature thereof rises above said predetermined temperature.

3. A water heating system for supplying heated water at a uniform temperature for processing operations, comprising a hot water storage tank, heating means connected to the hot water storage tank for heating water therein, a cold water storage tank, first conduit means for supplying incoming cold water to the hot water storage tank, second conduit means for supplying incoming cold water to the cold water storage tank, mixing valve means for mixing quantities of hot and cold water to a given processing temperature, outlet conduit means for conducting hot water from the hot water storage tank to said mixing valve means, second outlet conduit means connecting said cold water storage tank and said mixing valve means for conducting cold water to said mixing valve means, discharge conduit means for conducting water at the processing temperature from said mixing valve means to the processing equipment, thermostatic means responsive to the temperature of the incoming cold water for actuating said heating means and heating water in said hot water storage tank to a first high temperature when the temperature of the incoming water is above the processing temperature and for heating water in the hot water storage tank to a second high temperature substantially higher than said first high temperature when the temperature of the incoming water is below said processing temperature, and means for chilling water in said cold water storage tank to a temperature below the processing temperature when the temperature of said incoming cold water rises above said processing temperature.

4. A water heating system for supplying heated water at a uniform temperature for processing operations, comprising a hot water storage tank, a chilled water storage tank, first conduit means for supplying incoming cold water to the hot water storage tank, second conduit means for supplying incoming cold water to the chilled water storage tank, mixing valve means for mixing quantities of hot and chilled water to a given processing temperature, outlet conduit means for conducting hot water from the hot water storage tank to said mixing valve means, second outlet conduit means connecting said chilled water storage tank and said mixing valve means for conducting chilled water to said mixing valve means, discharge conduit means for conducting water at the processing temperature from said mixing valve means to the processing equipment, water heating means connected to the hot water storage tank, water chilling means connected to the chilled water storage tank, thermostatic means responsive to the temperature of the incoming cold water for actuating said water heating means to heat water in the hot water storage tank to a first high temperature when the temperature of the incoming cold water is above the processing temperature and for heating water in the hot water storage tank to a second high temperature substantially higher than said first high temperature when the temperature of the incoming cold water is below the processing temperature, and second thermostatic means responsive to the temperature of the incoming cold water for actuating said water chilling means to chill water in said chilled water storage tank to a temperature below said processing temperature when the temperature of the incoming cold water rises above the said processing temperature.

5. A water heating system for supplying heated water at a uniform temperature for processing operations, comprising a hot water storage tank, a chilled water storage tank, first conduit means for supplying incoming cold water to the hot water storage tank, second conduit means for supplying incoming cold water to the chilled water storage tank, mixing valve means for mixing quantities of hot and chilled water to a given processing temperature, outlet conduit means for conducting hot water from the hot water storage tank to said mixing valve means, second outlet conduit means for conducting chilled water from said chilled water storage tank to said mixing valve means, discharge conduit means for conducting water at the processing temperature from said mixing valve means to the processing equipment, water heating means connected to the hot water storage tank, water chilling means connected to the chilled water storage tank and connected in a first electrical circuit, first thermostatic means responsive to a first high temperature of the water in the hot water storage tank and connected in a second electrical circuit with said heating means, second thermostatic means responsive to a second high temperature of the water in the hot water storage tank substantially higher than said first high temperature and connected in a third electrical circuit with said heating means, third thermostatic means responsive to the temperature of the incoming cold water and operably connected to said first, second and third electrical circuits for completing said first and second circuits and starting said chilling means and said heating means when the temperature of the water in said hot water storage tank falls below said first high temperature and the temperature of the incoming cold water is above said processing temperature and for closing said third circuit and actuating said heating means when the temperature of the water in the hot water storage tank falls below said second high temperature and the temperature of the incoming cold water is below said processing temperature.

6. A water heating system for supplying heated water at a uniform temperature for processing operations, comprising a hot water storage tank, a chilled water storage tank, first conduit means for supplying incoming cold water to the hot water storage tank, second conduit means for supplying incoming cold water to the chilled water storage tank, mixing valve means for mixing quantities of hot and chilled water to a given processing temperature, outlet conduit means for conducting hot water from the hot water storage tank to said mixing valve means, second outlet conduit means for conducting chilled water from said chilled water storage tank to said mixing valve means, discharge conduit means for conducting water at the processing temperature from said mixing valve means to the processing equipment, water heating means connected to the hot water storage tank, water chilling means connected to the chilled water storage tank and connected in a first operating circuit, first thermostatic switch means disposed in contact with the water in said hot water storage tank and responsive to a first high temperature of the water in the hot water storage tank and connected in a second operating circuit with said heating means, second thermostatic switch means disposed in contact with the water in said hot water storage tank and responsive to a second high temperature of the water in the hot water storage tank substantially higher than said first high temperature and connected in a third operating circuit with said heating means, third thermostatic switch means disposed in contact with the incoming cold water and responsive to the processing temperature and operably connected to said first and second and third circuits and alternately connected in series with said first thermostatic switch means and said second thermostatic switch means respectively, and fourth thermostatic switch means disposed in contact with the water in said chilled water storage tank and responsive to a predetermined temperature of the water in said chilled water storage tank slightly lower than said processing temperature and operably connected in series with said third thermostatic switch means, whereby said third and fourth thermostatic switch means operate to complete said first and second circuits when the temperature of the incoming cold water is above said processing temperature and the temperature of the water in the chilled water storage tank is above said predetermined temperature and when the temperature of the water in the hot water storage tank is below said first high temperature to thereby actuate said heating means and said chilling means, and said third and fourth thermostatic switch means having corresponding operable positions in the third circuit to energize said third circuit and actuate said heating means when the temperature of the water in the hot water storage tank falls below said second high temperature.

7. The structure of claim 4, in which the water heating means comprises a water heating unit, a pair of conduits connected between said hot water storage tank and the heating unit to provide a closed system for the circulation of water between said tank and said heating unit, and pumping means disposed in one of said conduits for circuating heated water in said system.

8. The structure of claim 4, in which the chilling means comprises a water chilling unit, a pair of conduits connected between the chilled water storage tank and the chilling unit to provide a closed system for the circulating of water between said chilled water storage tank and said chilling unit, and pumping means disposed in one of said conduits for circulating chilled water in said system.

9. A method of supplying heated water at a uniform processing temperature to a processing apparatus, comprising introducing supply water to a cold water storage tank and to a hot water storage tank, maintaining the water in the hot water storage tank at a first high temperature when the temperature of the supply water is above the processing temperature and maintaining the water in the hot water storage tank at a second high temperature substantially higher than said first temperature when the temperature of the supply water is below said processing temperature, and mixing measured proportions of cold water from said cold water storage tank and hot water from said hot water storage tank to obtain water at said processing temperature, and conducting the water at the processing temperature to the processing apparatus.

10. A method of supplying heated water at a uniform processing temperature to a processing apparatus, comprising introducing supply water to a cold water storage tank and to a hot water storage tank, maintaining the water in the hot water storage tank at a first high temperaure when the temperature of the supply water is above the processing temperature and maintaining the water in the hot water storage tank at a second high temperature substantially higher than said first temperature when the temperature of the supply water is below said processing temperature, chilling the water in the cold water storage tank to a given temperature below the processing temperature when the temperature of the supply water is above the processing temperature, and mixing measured proportions of cold water from said cold water storage tank and hot water from said hot water storage tank to obtain water at said processing temperature, and conducting the water at the processing temperature to the processing apparatus.

11. A method of supplying heated water at a uniform processing temperature to a processing apparatus, comprising introducing water from a cold water supply to a hot water storage tank, heating the water in the hot water storage tank to a first high temperature when the cold water supply is above a given temperature and heating the water in the hot water storage tank to a second high temperature substantially higher than the first high temperature when he temperature of the cold water supply is below said given temperature, and mixing measured quantities of cold water and hot water from said hot water storage tank to obtain water at a processing temperature and passing the water at the processing temperature to a processing apparatus.

References Cited in the file of this patent

UNITED STATES PATENTS

| | | |
|---|---|---|
| 1,382,569 | Tait | June 21, 1921 |
| 2,129,427 | Jepertinger | Sept. 6, 1938 |